United States Patent Office

3,507,676
Patented Apr. 21, 1970

3,507,676
ZINC CONTAINING ALGICIDAL SURFACING,
METHOD, AND GRANULES
William A. McMahon, St. Paul, Minn., assignor to Minnesota Mining and Manufacturing Company, St. Paul, Minn., a corporation of Delaware
No Drawing. Filed Dec. 15, 1966, Ser. No. 601,859
Int. Cl. B44d 1/46, 1/02; D06n 5/00
U.S. Cl. 117—27                                8 Claims

ABSTRACT OF THE DISCLOSURE

Outdoor surfacing and granules such as roofing granules containing zinc, ZnO or ZnS, which surfacing is resistant to the growth of algae and/or fungi.

---

This invention relates to outdoor surfacing and granules therefor which are resistant to the growth of algae and/or fungus thereon.

Roofing granules, both natural and artificially color-coated, find extremely wide use in roofing and siding materials. Important applications are in granule surfaced bituminous roll roofing and shingles. The granules form a coating partially embedded in one surface of asphalt-impregnated and asphalt-coated fibrous sheet material to provide an adherent weather-resistant and decorative exterior surface.

For many years there has been what is commonly referred to as a "fungus" problem in the Gulf Coast area of the United States as well as in other isolated areas. This problem is manifest as a severe discoloration of house roofs, walls, decks, and the like. The dominant microorganism causing such discoloration on mineral coated asphalt roofs has been identified as the alga *Gloeocapsa magma*. Several other strains of algae along with some fungi are also generally found on the discolored surfaces in lesser amounts. In more northern coastal areas a similar problem has been caused by similar or other algae. The discoloration generally becomes visibly apparent during the second or third year after the surfacing has been applied, usually first in the form of dark spots which develop into streaks followed by a more or less complete covering of the surface by a dark colored growth which is particularly unsightly on originally light-colored roofing.

This invention provides effective protection to surfaces exposed in algae infested areas for periods of years. The invention provides algicidal compositions particularly desirable in the manufacture of white or other light-colored surfacing.

Numerous organic chemicals have been used to control or prevent the growth of fungi and algae. Such chemicals can not, however, be applied to roofing granules before firing or heating thereof to insolubilize the coatings because the organic compounds are volatilized or decomposed so as to be rendered ineffective. Application of such organic compounds over the surface of the fired granules does not provide lasting effects because of their poor weather resistance, and thus discoloration occurs nearly as soon as with untreated granules.

Highly water-soluble known algicidal compounds such as $CuSO_4$, which would be leached out of a surface by rainfall and other naturally occurring moisture within a few months would not be effective because the discoloration produced by algal growth often does not become visible for two or three years after installation of the surfacing. Thus such readily leachable material would not produce an appreciable delay in the appearance of the discoloration. Virtually water-insoluble compounds known to have anti-microbial effects, such as CuO, AgI and $Pb_3(PO_4)_2$ have proved ineffective for reasons not fully understood, perhaps due to insufficient solubility of the materials.

A useful algicide for outdoor surfacing must be capable of protecting the surfaces from algal growth for a length of time approximating the normal useful life of the surfacing. In accordance with this invention, substantially water-insoluble inorganic zinc-containing compositions such as metallic zinc and certain zinc compounds such as ZnO and ZnS, have proved surprisingly effective in maintaining surfaces coated therewith free of algal infestations for long periods of time, when incorporated in granule coating compositions in sufficient amounts. Metallic zinc pellets or particles may also be interspersed with conventional granules on a surface to make the surface resistant to the growth of microorganisms. Roofing granule coatings containing these compounds appear effective in maintaining surfaces such as roofs and siding coated therewith free of algae for a long period of years.

Zinc oxide has been used in the past as a pigment or insolubilizing agent in roofing granules. See, for example, U.S. Patent 2,057,678 (Gundlach) issued Oct. 20, 1936. However, such uses have been in quantities too small to produce a significant algicidal effect. In other cases, such as in U.S. Patent 2,362,489 (Jewett) issued Nov. 14, 1944, ZnO is used but is chemically converted in the granule manufacturing process to form reaction products such as spinels and/or binders which are insoluble even in acidic solutions and in which the zinc, therefore, is not available in sufficient quantities to provide protection against algal growth.

It is believed that the substantially water-insoluble inorganic zinc-containing compositions of this invention due to their insolubility in neutral solutions, are not washed out in heavy rainfalls which are frequent in most algae infested regions. However, in periods of dew or light drizzle when algal growth is most likely to occur, the quantity of moisture on a surface is smaller and this moisture becomes acidic apparently due to decomposition products of asphalt roofing substrates and to "atmospheric acids." The pH of such moist roofing is estimated to be in the range of 2–4. The algicidal compositions apparently are somewhat soluble under these acidic conditions and are released in amounts effective to prevent growth of algae on the surface. Thus the zinc algicides are very gradually released in sustained amounts over a period of years.

To be capable of being incorporated into fired coatings, the zinc algicides must be capable of withstanding the firing temperatures involved, which are often in the 800°–1000° F. range, and which exceed a minimum of 350° F. To be effective the zinc compound must be in a readily available form exposed on the surfacing or within a moisture permeable coating composition so that it can be gradually leached out when exposed to the elements.

The coatings of this invention have proved effective in retarding growth of algae when present on roofing granules in finely divided form in amounts sufficient to provide at least about 0.3 lb. per 100 square feet of roofing surface. This amount is provided by applying at least about 1% by weight of the coated granules of a zinc algicide, i.e., about 20 lbs. of zinc compound or metal per ton of granules. Since more zinc is present on a percentage basis in the case of metallic zinc than in the case of zinc compounds, zinc particles or powder may be effective in somewhat lesser amounts on a weight basis. 200 lbs. per ton is a practical upper limit for the amount to be added. Since the preferred zinc compounds, particularly ZnO or ZnS, are white or very light in color, they are desirable in the manufacture of white or light-colored surfacing.

Methods have long been known for the artificial coloring of roofing granules, consisting of crushed and screened minerals, in which the granules are coated with a suitable pigment in an inorganic binder. The binder is usually applied in the form of a soluble silicate solution which is insolubilized by seat treatment and/or chemical action to a substantially water-insoluble state to form a coating adherent to the base granule.

The soluble silicate binder is converted to an insoluble state by heat treatment and/or chemical action as by the addition of an acidic material such as $AlCl_3$, or clay, to the soluble silicate, either before, during, or after the application of the mixture of soluble silicate and pigment to the mineral granules, in order to obtain a reaction between the acidic material or clay and the alkaline portion of the silicate. The algicide can be simply mixed with any of these coating compositions.

Coating compositions commonly used on roofing granules are insolubilized clay-alkali metal silicate compositions such as those disclosed in U.S. Patent No. 2,379,358 (Jewett) issued June 26, 1945. Such compositions contain a hydrous clay such as kaolin and an alkali metal silicate, generally sodium silicate, which are heated to a temperature above the dehydration point of the silcate but below the melting point of the clay, e.g., 800–1000° F. to form an insoluble highly weather-resistant durable, yet somewhat water permeable, coating. These coating compositions contain appropriate pigments, generally metal oxides, to impart the desired color to the coating. It is understood the zinc algicide will affect the color of the granules, ZnO and ZnS producing lighter colored granules, while zinc metal causes a darkening of the granules. Recently it has been found desirable to add a small amount of an alkali soluble fluorocarbon surface active compound having a fluorocarbon "tail" in the molecule in order to improve the luminous reflectance (lightness) and/or color intensity of the coating. See U.S. Patent No. 2,951,770 (Lodge et al.) issued Sept. 6, 1960. It is also known that the addition of a small amount of borax to the composition makes possible the firing of the compositions at lower temperatures. See U.S. Patent No. 3,255,031 (Lodge et al.) issued June 7, 1966.

The alkali metal silicate-clay coatings are conventionally applied to any suitable base raw mineral granules, such as greystone (argillite) or nepheline syenite, by mixing an aqueous slurry of the coating composition thoroughly together with the granules and then firing. The alkali metal silicate-clay coatings, even though they are highly durable, water resistant and insoluble, are sufficiently permeable to permit some moisture to penetrate the same.

In addition to the above methods for incorporating the zinc algicide on the surface to be protected from algal growth, finely divided metallic zinc or barely soluble zinc compounds can be incorporated in a coating composition which can be insolubilized at low temperatures. Such compositions are disclosed generally in U.S. Patent No. 2,614,051 (Buzzell et al.) issued Oct. 14, 1952. Alternatively, the algicide can be included in an insolubilizing composition and thereby bonded to the surface of the granules using a method as generally disclosed in U.S. Patent No. 2,981,636 (Lodge et al.) issued Apr. 25, 1961. This method consists of applying a finely divided material with an insolubilizing acidic compound such as aluminum chloride.

In a further embodiment of the invention, zinc metal particles can be interspersed with conventional granules on a surface. The particles may be either bare, or coated with a colored coating such as used on the roofing granules. In either case the metal particles should be present in an amount sufficient to provide at least 0.3 lb. of metal per 100 ft.$^2$ of roofing surface in order to provide a significant algae-retarding effect. It is preferred, for convenience of application and for appearance, to use zinc metal particles of approximately the same size as, or slightly smaller than, the granules, usually between 0.3 and 3.5 mm. in diameter. If desired, the metal can be applied as a powder on the shingles after the granules have been adhered thereto. It will be apparent that greater surface area is available when smaller size particles are used, thus providing an increased rate of dissolution, but significant quantities must still be present to provide long term protection against algal growth.

The following examples in which all parts given are by weight unless otherwise specified will serve to further illustrate the invention.

EXAMPLE I

A first coating composition of the following formulation is prepared by mixing the ingredients:

| Ingredients: | Parts |
|---|---|
| $TiO_2$ (rutile) | 8.0 |
| Kaolin | 50.0 |
| Potassium salt of N-ethyl, N-perfluoroctane sulfonyl glycine having the formula $C_8F_{17}SO_2N(C_2H_5)CH_2COOK$ | 0.01 |
| Sodium silicate (aqueous, 42.9% solids) ($Na_2O:SiO_2$ ratio 1:2.9) | 64.0 |
| $H_2O$ | 25.0 |

This composition is applied to 2000 parts of #11 grade (−10+35 mesh Tyler) granules, for example, nepheline syenite granules in a tumbling barrel type mixer. The coating is then pre-dried by passing a stream of heated air on the granules in the mixer. The granules are then transferred to a rotary firing pot and fired to 950° F., removed from the firing pot and allowed to cool.

In the meantime a second coating composition is prepared by mixing ingredients in accordance with the following formulation:

| Ingredients: | Parts |
|---|---|
| TiO (rutile) | 4.0 |
| Kaolin | 12.5 |
| Zinc oxide, pigment grade | 20.0 |
| $C_8F_{17}SO_2N(C_2H_5)CH_2COOK$ | 0.01 |
| Sodium silicate (aqueous, 42.9% solids) | 60.0 |
| $H_2O$ | 20.0 |

The second coating composition is applied to the colored pre-coated granules in the mixer, following which the granules are dried, transferred to the firing pot and then fired to 1000° F. to insolubilize the silicate coating. The granules are again poured out of the firing pot and allowed to cool.

The cooled granules are treated with a suitable oil and adhesion treatment in accordance with conventional practice and applied to an asphalt roofing shingle. Roofing shingles made in the above manner were tested for resistance to growth of algae by attaching them to a test rack positioned at a 45° angle and facing north near Houston, Texas.

In order to intensify the exposure to algal infection, an algae infested seed shingle removed from an infested roof was placed directly above the test shingle. A control shingle was prepared in the same manner with the zinc oxide omitted from the coating and similarly positioned on the test rack beneath an algae infested seed shingle. A further algae infested seed shingle was attached directly below the test shingle and the control shingle. After a period of 26 months of exposure the test shingle showed very little algal growth whereas the control shingle was heavily infested. Duplicate samples of the above lots were subjected to 21 months of exposure without contact with seed shingles and then mounted in contact with seed shingles and exposed for an additional 26 months. After a total period of 47 months exposure, the test shingles showed only a mild infestation of algae while the control shingle was heavily infested. In comparison, test lots containing 10 pounds per ton of zinc oxide showed almost as much infestation by algae as did the control lots.

EXAMPLE II

Roofing granules were prepared as in Example I with the difference that 20 parts of pigment grade zinc sulfide were substituted for the 20 parts of zinc oxide. The granules were applied to conventional asphalt roofing shingles.

When placed on a test rack in the same manner and for the same periods of time as the test shingles of Example I, the shingles containing the zinc sulfide showed a high degree of resistance to algal growth as compared with control shingles not containing any zinc compounds and a slightly increased resistance to algal growth as compared with the zinc oxide containing granules of Example I. In addition, the zinc sulfide containing granules exhibited a noticeable clean up effect on the seed shingles mounted beneath them.

EXAMPLE III

A surfacing mixture for conventional asphalt shingles is prepared by mixing the ingredients:

| Ingredients: | Parts |
|---|---|
| Roofing granules, untreated, former by procedure of Example II of Lodge et al., U.S. Patent No. 3,255,031 issued June 7, 1966 | 100 |
| Zinc (metal particles, 40 mesh, 0.417 mm. average diameter) | 1 |

The above ingredients are mixed in a rotary mixer until the zinc is well distributed throughout the granules. The mixture is then treated with a suitable oil in accordance with conventional practice and applied as surfacing to an asphalt roofing shingle.

Roofing shingles prepared in the above manner were placed on test racks in the same manner as described in Example I. Test shingles after 26 months exposure showed only moderate algal growth, while the control shingle was nearly completely infested.

EXAMPLE IV

| Ingredients: | Parts |
|---|---|
| Roofing granules of Example III | 2000 |
| Zinc oxide, pigment grade | 20 |
| Aluminum chloride (10% solution) (solids) | 1.5 |

The roofing granules are coated with the combination of zinc oxide and aluminum chloride solution while they are still hot (300–350° F.) from the drying or dehydration step of the conventional roofing granule coating process. Following this step the cooled granules are treated with a suitable oil in accordance with conventional practice and applied to an asphalt roofing shingle.

Shingles so prepared and tested in the manner of Example I showed practically no algal growth after 25 months exposure while the control shingle became about 50% covered by algae. In addition the algal growth on the seed shingle directly under the test shingle was reduced by approximately 50%.

EXAMPLE V

Roofing granules prepared as in Example IV with the difference that 20 parts of zinc sulfide were substituted for 20 parts of zinc oxide.

Shingles prepared with these granules and tested in the same manner as Example I showed only moderate algal growth after 25 months and about 20% clean up of the seed shingles directly below.

EXAMPLE VI

Roofing granules prepared as in Example IV with the difference that 20 parts of metallic zinc dust were substituted for 20 parts of zinc oxide.

Shingles prepared with these granules and tested in the same manner as Example I showed only a trace of algal growth after 25 months exposure, while the control shingle showed 50% infestation. In addition, the algal growth on the seed shingle directly under the test shingle was reduced by approximately 65%.

What is claimed is:

1. Algicidal roofing granules comprising base inorganic granules coated with a moisture permeable insoluble pigmented, fired inorganic composition containing at least about 1% by weight of the coated granules of a substantially water insoluble inorganic zince algicide having slight solubility in water having a pH of from about 2 to 4 sufficient to maintain a condition toxic to the growth of algae on a surface coated with said granules for a period of years.

2. Roofing granules according to claim 1 wherein said moisture permeable insoluble pigmented composition comprises a heat reaction product of a hydrous clay and alkali metal silicate.

3. Roofing granules according to claim 1 wherein said zinc algicide is zinc oxide.

4. Roofing granules according to claim 1 wherein said zinc algicide is zinc sulphide.

5. Roofing granules according to claim 1 wherein said zinc algicide is zinc metal.

6. A composite sheet body for roofing and siding comprising a bitminous sheet material having a firmly adherent surfacing of granules coated with a moisture permeable insoluble pigmented, fired inorganic alkali metal silicate composition containing at least about 0.3 lb. per 100 ft.$^2$ of surface of a zinc containing material selected from metallic zinc, ZnO, and ZnS, whereby said sheet body is resistant to the growth of discoloring microorganisms thereon for a period of years.

7. An exterior building surface comprising a substrate, a coating of decorative, protective, weatherable, granular, inorganic material on said substrate and an algicidal zinc material selected from the group consisting of metallic zinc, zinc oxide and zinc sulphide coated with a insoluble, fired, inorganic alkali metal silicate composition, said zinc material interspersed with said granular inorganic material on said substrate in a quantity to provide at least 0.3 lb. per 100 square feet of surface area.

8. A process for making an algicidal roofing granule comprising the steps of applying to a mineral granule an aqueous slurry containing an alkali metal silicate, clay and a substantially water insoluble inorganic zinc algicide selected from the group consisting of metallic zinc, zinc oxide and zinc sulphide, drying said coating and firing said coating at a temperature of from about 800 to about 1000° F.

References Cited

UNITED STATES PATENTS

| 3,423,229 | 1/1969 | Kompanek | 117—169 |
| 2,583,545 | 1/1952 | Cameron | 106—15 |

WILLIAM D. MARTIN, Primary Examiner

W. R. TRENOR, Assistant Examiner

U.S. Cl. X.R.

106—15; 117—30, 31, 100, 25, 32, 160